United States Patent Office 3,101,370
Patented Aug. 20, 1963

3,101,370
1,1'-METHYLENE-(1-METHYL-3-PHENYL)-UREAS
James B. Buchanan, Wilmington, Del., assignor to E. I. du Pont de Nemours and Company, Wilmington, Del., a corporation of Delaware
No Drawing. Filed Aug. 24, 1960, Ser. No. 51,490
1 Claim. (Cl. 260—553)

This invention relates to certain 1,1'-methylene-bis(3-aryl-1-methylureas) and to herbicidal compositions and methods employing them.

More specifically the compounds of this invention are those represented by the formula:

(1) 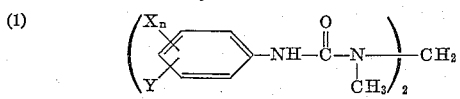

wherein X is hydrogen, halogen or an alkyl radical of less than 5 carbon atoms; Y is hydrogen, halogen, nitro or an alkyl radical of less than 5 carbon atoms; and $n$ is a positive integer of less than 3, namely 1 or 2.

The 1,1'-methylenebis (3-aryl-1-methylureas) of this invention can be prepared by the reaction of the appropriate 1-methyl-3-arylurea with chloromethyl methyl ether in the presence of sodium bicarbonate in an organic solvent in which the product is soluble, such as acetone. Conveniently, the chloromethyl methyl ether can be added gradually to a slurry of the 1-methyl-3-arylurea and the sodium bicarbonate in the solvent. The addition is carried out at 25–60° C. over a period of from ½ to 2 hours. The precipitated sodium chloride is filtered off and the product isolated by evaporation of the filtrate.

The reaction taking place in the preparation of the compounds of this invention can be illustrated generally by the following equation:

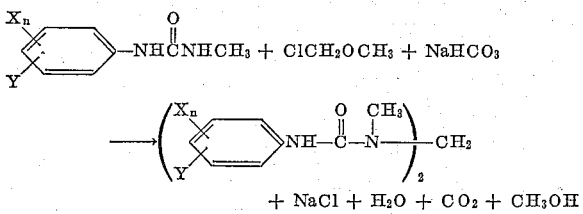

Of the above-described compounds, by far the best from the standpoint of ease and economy of preparation and usage are the following:

1,1'-methylenebis(1methyl-3-phenylurea)
1,1'-methylenebis(3-p-chlorophenyl-1-methylurea)
1,1'-methylenebis[3-(3,4-dichlorophenyl)-1-methylurea]
1,1'-methylenebis(3-m-chlorophenyl-1-methylurea)
1,1'-methylenebis[1 - methyl-3-(2,4,5 - trichlorophenyl)-urea]

It has been found that the compounds of this invention possess an outstanding degree of selective herbicidal activity. They have particular utility for pre-emergence and directed post-emergence control of annual grass and broadleaf weeds in certain woody ornamental plants. Application at rates of 0.5 to 4 pounds per acre gives excellent control of such weeds as crabgrass, water grass, foxtail, chickweed, mustard, pigweed and lamb's-quarters growing in areas planted to privet, spruce, Euonymus, arbor vitae and other ornamental species. These compounds can also be used for the control of the above listed annual weeds in established stands of *Sericea lespedeza*, Sansevieria and safflower.

Herbicidal compositions of the invention are prepared by admixing one or more of the substituted ureas, in herbicidally effective amounts, with a conditioning agent of the kind used and referred to in the art as a pest control adjuvant or modifier to provide formulations adapted for ready and efficient application to soil or weeds (i.e., unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound or compounds with finely-divided solids, preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dust or powder form.

Liquid compositions of the invention are prepared in the usual way by admixing one or more of the substituted ureas with a suitable liquid diluent medium. With certain solvents such as alkylated naphthalene, dimethylformamide and cresol, relatively high, up to about 35% by weight or more, concentrations of the active urea compound can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing or emulsifying agent. These agents which will be referred to hereinafter more simply as surface-active dispersing agents cause the compositions to be easily dispersed in water to give aqueous sprays which for the most part constitute a desirable composition for application.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in detail in an article by McCutcheon in "Soap and Chemical Specialties," volume 31, No. 7–10 (1955).

Generally the surface-active agent will not comprise more than about 5 to 15% by weight of the composition depending, of course, upon the particular surface-active agent, the system in which it is placed, and the result desired, and in certain compositions, the percentage will be 1% or less. Usually the minimum lower concentration will be 0.1%.

The herbicidal compositions are applied either as a spray, a dust or as granules to the locus or area to be protected from undesirable plant growth, commonly called weeds, i.e., plants growing where they are not wanted. Such application can be made directly upon the locus or area and the weeds thereon during the period of weed infestation in order to destroy the weeds but, if desired, the application can be made in advance of an anticipated weed infestation to prevent such infestation. Thus the compositions can be applied as aqueous foliar sprays and can also be applied as sprays directly to the surface of the soil. Alternatively, the dried powder compositions can be dusted directly on the undesirable plants or on the soil.

The active compound is, of course, applied in amount sufficient to exert the desired herbicidal action. The amount of the active substituted ureas present in the compositions as actually applied for destroying, preventing or controlling weeds will vary with the manner of application, the particular weeds for which control is sought, the purposes for which the application is being made, and like variables. In general, the herbicidal compositions as applied in the form of a spray or a dust will contain from about 0.5% to 85% by weight of substituted urea or a combination of such ureas.

Fertilizer materials, other herbicidal agents, and other pest control agents such as insecticides and fungicides can be included in the herbicidal compositions of the invention if desired.

In order that the invention may be better understood, the following examples are given in addition to the examples already given above. The examples illustrate the preparation of the substituted ureas, herbicidal formulations employing such compounds, herbicidal applications, and the results obtained.

EXAMPLE 1

*1,1′-Methylenebis(1-Methyl-3-p-Chlorophenylurea)*

A slurry of 27.65 parts of 1-p-chlorophenyl-3-methylurea and 13.42 parts of sodium bicarbonate in 150 parts of acetone is warmed to 30–35°, then stirred vigorously and treated over a 20-minute period with a solution of 12.9 parts of chloromethyl methyl ether in 10 parts of acetone. The stirring is continued for 45 minutes longer at 30–40° C. after which the precipitated sodium chloride is filtered off. The filtrate is evaporated to a gummy residue which is taken up in 150 parts of hot benzene. On standing, a crystalline white solid separates. This is collected and washed with cold benzene to give 15.3 parts of crude 1,1′-methylenebis(1-methyl-3-p-chlorophenylurea), M.P. 142–165°. It may be purified by recrystallization from benzene or acetonitrile. Pure material melts at 182–184°.

EXAMPLES 2–12

The compounds listed in Table I are prepared from the respective starting materials according to the procedure described in Example 1.

TABLE I

| Ex. No. | Starting Material | |
|---|---|---|
| 2 | 1-methyl-3-phenylurea | 1,1′-methylenebis(1-methyl-3-phenylurea). |
| 3 | 1-methyl-3-p-tolylurea | 1,1′-methylenebis(1-methyl-3-p-tolylurea). |
| 4 | 1-methyl-3-p-ethylphenylurea | 1,1′-methylenebis(1-methyl-3-p-ethylphenylurea). |
| 5 | 1-methyl-3-m-isobutylphenylurea | 1,1′-methylenebis(1-methyl-3-m-isobutylphenylurea). |
| 6 | 1-methyl-3-(3,4-dichlorophenyl)urea | 1,1′-methylenebis[1-methyl-3-(3,4-dichlorophenyl)urea]. |
| 7 | 1-methyl-3-(3,5-dibromophenyl)urea | 1,1′-methylenebis[1-methyl-3-(3,5-dibromophenyl)urea]. |
| 8 | 1-methyl-3-(3,4-dimethylphenyl)urea | 1,1′-methylenebis[1-methyl-3-(3,4-dimethylphenyl)urea]. |
| 9 | 1-methyl-3-(3-methyl-4-chlorophenyl)urea | 1,1′-methylenebis[1-methyl-3-(3-methyl-4-chlorophenyl)urea]. |
| 10 | 1-methyl-3-(3,4,5-trifluorophenyl)urea | 1,1′-methylenebis[1-methyl-3-(3,4,5-trifluorophenyl)urea]. |
| 11 | 1-methyl-3-(p-iodophenyl)urea | 1,1′-methylenebis(1-methyl-3-p-iodophenylurea). |
| 12 | 1-methyl-3-(4-chloro-3-nitrophenyl)urea | 1,1′-methylenebis[1-methyl-3-(4-chloro-3-nitrophenyl)urea]. |

Examples of formulations and applications:

EXAMPLE 13

| | Percent |
|---|---|
| 1,1′ - methylenebis(1 - methyl - 3 - p - chlorophenylurea) | 80.00 |
| Alkyl naphthalene sodium sulfonate | 1.00 |
| Methyl cellulose (low viscosity) | 0.25 |
| Attapulgite | 18.75 |

The above components are blended together in a ribbon blender, then micropulverized, until the particle size is substantially below 50 microns and reblended to form a wettable powder suitable for dispersion in water and application by standard spraying equipment.

This formulation, when applied as a directed post-emergence treatment at a rate of 3 lbs. of active ingredient per acre with a tractor-mounted pressure sprayer, gives excellent control of chickweed growing in an area planted to established yew (Taxus).

EXAMPLE 14

| | Percent |
|---|---|
| 1,1′-methylenebis(1-methyl-3-phenylurea) | 50.00 |
| Sodium "Lorol" sulfate | 0.75 |
| Sodium lignin sulfonate | 1.00 |
| Kaolin clay | 48.25 |

The above composition is treated in the same manner as Example 13 to yield a wettable powder suitable for preparing a water dispersion.

This formulation, when applied at a rate of 2 lbs. of active ingredient per acre with a conventional pressure-type hand sprayer, gives pre-emergence control of crabgrass growing in a nursery planted to established arbor vitae.

EXAMPLE 15

| | Percent |
|---|---|
| 1,1′-methylenebis(1-methyl-3-p-tolyluren) | 75.00 |
| Fine particled synthetic silica | 23.50 |
| Oleyl ester of sodium isothionate | 1.00 |
| Naphthalene sulfonic acid-formaldehyde condensation product, Na salt | 0.50 |

The above composition is treated in the same manner as Example 13 to yield a powder which wets and disperses readily when added to water.

This formulation, when applied at a rate of 4 lbs. of active ingredient per acre, gives good pre-emergence control of annual broadleaf and grass weeds in established Deutzia.

EXAMPLE 16

| | Percent |
|---|---|
| 1,1′-methylenebis(1-methyl-3-p-ethylphenylurea) | 10 |
| Attapulgite | 10 |
| Micaceous talc | 80 |

The urea and attapulgite are first blended together and micropulverized to an average particle size below 50 microns. This product is then blended with the talc to yield a composition suitable for application with standard dusting equipment.

EXAMPLE 17

1,1′-methylenebis(1-methyl-3-phenylurea) is formulated in the manner described for Example 13.

At 3 pounds of active ingredient per acre in 40 gallons of water as a directed post-emergence spray, this formulation gives good control of an emerged stand of weeds (foxtail, crabgrass, pigweed, lamb's-quarters and mustard) growing in established stands of *Sericea lespedeza*, Sansevieria and safflower.

EXAMPLE 18

| | Percent |
|---|---|
| 1,1′-methylenebis(1 - methyl - 3 - m - isobutylphenylurea) | 20 |
| Kaolin clay | 20 |
| Tobacco dust | 60 |

The above composition is prepared in the same manner as Example 13, first grinding the active ingredient with the minor diluent, then blending with the major diluent to yield a product with free flowing characteristics suitable for dust application.

EXAMPLE 19

| | Percent |
|---|---|
| 1,1′-methylenebis[1-methyl - 3(3,4 - dichlorophenyl)urea] | 15 |
| Diatomaceous silica | 15 |
| Pyrophyllite | 70 |

This composition is prepared in the same manner as Example 13, yielding a free-flowing dust.

EXAMPLE 20

| | Percent |
|---|---|
| 1,1'-methylenebis(1-methyl-3,5-dibromophenyl-urea) | 30.0 |
| Hydrated attapulgite | 3.0 |
| Sodium lignin sulfonate | 15.0 |
| Water | 51.2 |
| Disodium phosphate | 0.8 |

The components are mixed together and wet milled with high shear in a pebble or sand mill until the particle size is substantially all below 5 microns. The resulting aqueous dispersion is stable against settling and is diluted with water before spraying.

This formulation, when applied at a rate of 4 lbs. of active ingredient per acre with a hand-operated sprayer, gives good control of a seedling Johnson grass and water grass infestation in a barberry planting.

EXAMPLE 21

| | Percent |
|---|---|
| 1,1'-methylenebis[1-methyl-3-(3-methyl-4-chlorophenyl)urea] | 40 |
| Bentonite clay | 2 |
| Sodium lignin sulfonate | 5 |
| Water | 53 |

The above composition is milled in the same manner as Example 13 to yield a stable aqueous dispersion.

This formulation, when applied with a pressure type bicycle sprayer at a rate of 3.5 lbs. of active ingredient per acre as a pre-emergence treatment to a field of established maple and tulip poplar plantings, gives control of germinating broadleaf weeds, such as pigweed and lamb's-quarters.

EXAMPLE 22

| | Percent |
|---|---|
| 1,1'-methylenebis[1-methyl-3-(3,4-dimethylphenyl)urea] | 25 |
| Hydrated attapulgite | 59 |
| Alkyl, aryl, sodium sulfonate | 1 |
| Anhydrous sodium sulfate | 15 |

The above composition is first micropulverized and blended, then moistened with 15–20% water and extruded under pressure to form pellets which, when dried, are suitable for convenient application by hand.

This formulation, when applied at a rate of 20 lbs. of active ingredient per acre, gives good control of broadleaf and grassy weeds in forest fire lanes.

EXAMPLE 23

| | Percent |
|---|---|
| 1,1-methylenebis(1-methyl-3-p-chlorophenyl-urea) | 30 |
| Diesel oil | 70 |

The above components are mixed and milled in a ball or roller mill until the average particle size of the active material is below 5 microns. The resulting suspension is diluted further with an herbicidal oil and sprayed.

This formulation is applied at a rate of 1.5 lb. of active ingredient per acre in combination with sufficient diesel oil to make a total application of 60 gal. of solution per acre.

When applied as a directed post-emergence spray to an infestation of chickweed and annual bluegrass, excellent control is obtained without injury to established juniper.

EXAMPLE 24

| | Percent |
|---|---|
| 1,1'-methylenebis[1-methyl-3-(4-chloro-3-nitrophenyl)urea] | 10 |
| Ground vermiculite (No. 4 granules) | 85 |
| Gum arabic | 5 |

In preparation the active ingredient is first micropulverized, then suspended in excess water with the gum arabic and sprayed upon the vermiculite while it is agitated in a blender. Upon drying, the active ingredient is firmly attached and evenly distributed through the vermiculite to yield a free-flowing, granular composition suitable for application with a fertilizer spreader.

This formulation, when applied as a pre-emergence treatment at a rate of 3 lbs. of active ingredient per acre with a tractor-drawn fertilizer spreader, gives excellent control of annual broadleaf and grass weeds in a pine planting.

EXAMPLE 25

| | Percent |
|---|---|
| 1,1'-methylenebis[1-methyl-3-(3,4-dichlorophenyl)urea] | 30 |
| Hydrated attapulgite | 3 |
| Sodium lignin sulfonate | 15 |
| Water | 51.2 |
| Disodium phosphate | 0.8 |

The components are mixed together and wet milled with high shear in a pebble or sand mill until the particle size is substantially all below 5 microns. The resulting aqueous dispersion is stable against settling and is diluted with water before spraying.

This formulation, when applied at a rate of 4 lbs. of active ingredient per acre with a tractor-mounted pressure sprayer, as a pre-emergence treatment, gives good control of crabgrass, foxtail, buttonweed, ragweed and chickweed in a nursery containing established hemlock, cedar, spruce and yew plantings.

This application is a continuation-in-part of my copending application Serial No. 786,910, filed January 15, 1959, and now abandoned.

The invention claimed is:

A 1,1'-methylenebis(1-methyl-3-arylurea) of the formula

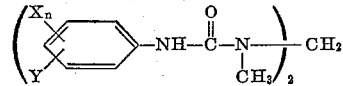

wherein X is selected from the group consisting of hydrogen, halogen and alkyl of less than 5 carbon atoms, Y is selected from the group consisting of hydrogen, halogen, nitro and alkyl of less than 5 carbon atoms, and $n$ is a whole number less than 3.

References Cited in the file of this patent

UNITED STATES PATENTS

| 2,651,620 | Hill et al. | Sept. 8, 1953 |
| 2,876,088 | Hill et al. | Mar. 3, 1959 |
| 2,898,206 | Monoogian | Aug. 4, 1959 |
| 2,931,832 | Fancher | Apr. 5, 1960 |
| 2,936,322 | Pfanstiel | May 10, 1960 |

OTHER REFERENCES

Rice et al.: J. Amer. Chem. Soc., volume 75 (1953), pages 1750–1.